United States Patent
Ali et al.

(10) Patent No.: US 9,626,527 B2
(45) Date of Patent: Apr. 18, 2017

(54) SERVER AND METHOD FOR SECURE AND ECONOMICAL SHARING OF DATA

(71) Applicant: Gemalto SA, Meudon (FR)

(72) Inventors: Asad Mahboob Ali, Austin, TX (US); Ella Segura, Austin, TX (US)

(73) Assignee: GEMALTO SA, Meudon (FR)

( * ) Notice: Subject to any disclaimer, the term of this patent is extended or adjusted under 35 U.S.C. 154(b) by 106 days.

(21) Appl. No.: 14/071,179

(22) Filed: Nov. 4, 2013

(65) Prior Publication Data

US 2015/0127937 A1    May 7, 2015

(51) Int. Cl.

| | |
|---|---|
| *G06F 21/62* | (2013.01) |
| *H04L 9/08* | (2006.01) |
| *H04L 29/06* | (2006.01) |
| *H04L 29/08* | (2006.01) |

(52) U.S. Cl.
CPC .......... *G06F 21/6218* (2013.01); *G06F 21/62* (2013.01); *H04L 9/0861* (2013.01); *H04L 63/0428* (2013.01); *H04L 63/101* (2013.01); *H04L 67/02* (2013.01); *H04L 67/10* (2013.01); *G06F 2221/2107* (2013.01); *G06F 2221/2141* (2013.01)

(58) Field of Classification Search
CPC .............. H04L 67/1097; H04L 65/403; H04L 65/4084; H04L 9/0822; H04L 9/14; H04L 9/3263; H04L 63/10; H04L 63/104; H04L 9/065; G06F 3/067; G06F 17/30171; G06F 21/60; G06F 2221/214; G06F 17/30115

See application file for complete search history.

(56) References Cited

U.S. PATENT DOCUMENTS

| | | | | |
|---|---|---|---|---|
| 8,326,814 | B2* | 12/2012 | Ghods et al. | 707/703 |
| 2009/0282240 | A1* | 11/2009 | Zhou et al. | 713/156 |
| 2010/0161964 | A1 | 6/2010 | Dodgson et al. | |
| 2013/0305039 | A1* | 11/2013 | Gauda | 713/153 |
| 2013/0311598 | A1* | 11/2013 | Arrouye et al. | 709/217 |

FOREIGN PATENT DOCUMENTS

| | | |
|---|---|---|
| WO | 0075754 A2 | 12/2000 |
| WO | 2007048969 A1 | 5/2007 |

OTHER PUBLICATIONS

Wikipedia NPL—Bitcasa company.*
International Search Report and Written Opinion issued by the International Searching Authority on Jan. 20, 2015 in corresponding PCT Application No. PCT/EP2014/072498 (11 pages).

* cited by examiner

*Primary Examiner* — Jung Kim
*Assistant Examiner* — Tri Tran
(74) *Attorney, Agent, or Firm* — Buchanan Ingersoll & Rooney PC

(57) ABSTRACT

The present invention relates to a web server having a web application using published API of one or more cloud storage providers, said web application being dedicated to secure and economical sharing of encrypted files residing at the cloud storage providers, said files being managed under a virtual folder which is shared by a group of different entities.

14 Claims, 6 Drawing Sheets

SERVER AND METHOD FOR SECURE AND ECONOMICAL SHARING OF DATA

FIELD OF THE INVENTION

This invention relates to secure sharing of encrypted data stored on a third-party server on the Internet. The need for such encryption arises in the context of cloud storage, where enterprises and individual users store their data on a cloud storage service on the Internet instead of a local repository. The cloud concept enables data to be publicly accessible from a variety of end-points such as office PC, home PC, and user's mobile devices. Specifically, the invention concerns a web application server that leverages the published API of one or more cloud storage providers. The web application is dedicated to secure sharing of encrypted files residing at the cloud storage providers. According to the invention, the secure sharing economizes the utilization of storage resources on the cloud storage providers from a user's point of view.

BACKGROUND OF THE INVENTION

While the cloud model offers convenience and reduces cost, there are always lingering concerns about the security and confidentiality of data stored at the cloud storage service. Such concerns are especially critical when dealing with enterprise data that needs to be shared with other authorized users, both internal colleagues and external partners.

Cloud storage providers, such as Box and Dropbox, publish APIs for $3^{rd}$ party companies to use for developing custom products that offer additional file related services, built upon the storage capability of the cloud provider. When it comes to file sharing, the available APIs vary between storage providers and do not always include all the necessary APIs for an end-to-end solution. Products exist to enable the encryption of data but no client-managed encryption solution is known to offer flexible use of data storage, and dynamic access control without re-encrypting the stored data. Existing products also do not support file sharing between several devices and/or between several users.

Further alternative and advantageous solutions would, accordingly, be desirable in the art.

SUMMARY OF THE INVENTION

The present invention aims at providing a secure and economical sharing of files among several entities.

The present invention is defined, in its broadest sense, as a server wherein files are managed under a virtual folder which is shared by a group of different entities, each entity having an identifier, said server having an interface with the entities to receive and send them files and having an interface with the cloud storage providers to receive and send files from and to the corresponding folder stored at the cloud storage provider, said server further having, for the implementation of the web application:

- a key generator to generate at least a master key for each virtual folder dedicated to the encryption of files to be shared with the group in said folder,
- access to an encrypted file issued from encryption using said master key of a file originating from one of the entity in the group,
- an authorization control list (ACL) for each shared folder, said ACL listing identifiers of entities authorized to decrypt the encrypted files that are part of the said shared folder, and are stored at the cloud storage provider,
- an ACL manager to manage the content of the ACL,
- said interface with the cloud storage provider being such that it sends the encrypted file on a single account in the cloud storage provider, thus providing economical sharing of files among several entities by using storage quota of only a single account per file shared, and said interface being such that, on request from one entity of the group for a file in the folder, after check of the authorization of this entity in the ACL, it retrieves the shared encrypted file from the single account and forwards it to the requesting entity.

The invention uses the published API of the storage provider, and offers a web interface to the users, which is very similar to the storage provider's user interface. The users get the same experience as though they were using the cloud storage service directly.

This invention allows secure sharing of encrypted data stored at a storage provider using an authorization control list (ACL) and the creation of virtual share folders to store encrypted files. With the invention the authorization to access virtual share folder is managed in the ACL. With the use of the authorization control list managed by the web server according to the invention, publically accessible file's URI are protected. The web server manages the aggregation to present unified content for a shared folder to all the users in the shared folder's ACL. The web server of the invention controls the individual file URI's and verifies user authorization requests against each shared folder's ACL.

The use of ACL enables the users to be added to and removed from a shared folder's ACL dynamically, without modifying the encryption on files already stored in the shared folder. When a user is removed from a shared folder's ACL, two additional steps are performed. First, any files contributed by this removed user are copied to the storage service account of the owner of the shared folder. This ensures that other users of the shared folder can continue to have access to these shared files. Second, these shared files are deleted from the storage service account of the removed user, so that they do not occupy storage space and unnecessarily use up storage quota.

With the invention, the data sharing is accomplished using shared folders created for this purpose and where files are uploaded. The web server maintains a dedicated, unique encryption master key for each shared folder. This encryption master key is used to protect all files added to the specific shared folder, or to the sub-folders created inside this shared folder. Access to shared folders is controlled by the web server itself and the authorization control list and not by the storage provider. The web server of the invention manages a separate ACL for each shared folder, allowing the owner to specify which users are authorized to access the shared folder.

Also, each shared file is hosted on a single account on the storage provider. The account used is of the user who uploads the file. Thus it only counts against storage quota of a single user. All other users can access the file for free using the public URI as soon as they are registered with access authorization in the authorization control list. The file sharing according to the invention is economical because data are stored in a single account. It is also economical for users as, except for the account where data are stored, other participants of the shared folder do not see the quota usage on their account.

In addition, the solution of the invention removes the need for synchronization of files between different users in a sharing scenario. Also, no data is lost when one or more users in the share group leave the group. The files stored on their account are preserved for use by other members of the group. Data in files can thus be shared with other selected users of the web server.

According to a first preferred embodiment, the server of the invention further includes an encryption/decryption module to encrypt the file to be shared inside the server, the access to the encrypted file being provided by this encryption/decryption module, said encryption/decryption module also decrypting the retrieved shared encrypted file before forwarding it to requesting entity.

In this embodiment, by acting as an intermediary between user's browser and cloud storage, the web server of the invention can seamlessly encrypt data before forwarding it to the storage provider, and decrypt it before passing it back to the user.

In this embodiment, adding a file to a shared folder requires the following steps:
1. Clear-text is uploaded from the user's computer to the web server.
2. The web server authorizes the user according to the shared folder's ACL.
3. The web server encrypts the clear file using the share folder master key.
4. Encrypted file is uploaded from the web server to the storage provider.
5. The web server gets a public link to this file from the storage provider.
6. The web server gets a copy reference link to this file from the storage provider.
7. The web server saves the public and copy reference links, plus additional file metadata to the database.

It has to be noted here that the term "clear-text" does not refer to text files, but rather to files that are in the clear, and not yet encrypted. Once encrypted, such files are commonly called "cipher-text". Both binary and text (ASCII) files are thus implied.

All users that have access to a shared folder are allowed to download files belonging to this shared folder. To download a file, the web server uses the public link created in step 5 above to retrieve the encrypted file from the storage provider. The encrypted file is decrypted using the shared folder master key, and then downloaded to the user's client browser in the clear.

Advantageously, said key generator also generates an entity specific key and have a secure provisioning module to provision said entity with the specific key, requests from this entity being further signed using the entity specific key before being sent to the server, said server further includes a cryptography module to verify such signatures.

This advantageous embodiment enables to check the origin of the request to store files or the origin of the request to access stored files. It specially concerns the mobile devices for which security breach can be observed.

In advantageous applications of the invention, entities are chosen among the group formed by web browser clients, PC client applications, mobile devices.

Such entities are the most commonly used to access cloud service provider. They are also particularly concerned by security issues and the invention would be particularly adapted to deal with such issues. In the case of PC client applications, the server cannot send push notifications and the invention is thus particularly adapted to this situation.

According to a second embodiment of the invention, said server provisions entities of the group with the generated master key in order to enable them to encrypt themselves a file to be shared and to send the encrypted file to said server, the access to the encrypted file being thus provided by such an entity.

In this embodiment, the invention is a fully client managed solution to encrypt data stored in the cloud. The file is encrypted on the user equipment side before being sent to the web server. The web server here manages the authorization control list and the forwarding to the storage provider. It still enables a single account to be charged for storage. It can be noted here that a same web server could implement the two presented embodiments depending on the addressed storage provider or on the kind of concerned user equipment for example.

According to a particular feature, the single account where the encrypted file is stored at the cloud storage provider is the account of the entity from which the file originates.

This optional feature enables to structure the file storage and the share folders management. Files in a shared folder are thus stored in their respective user's storage provider account, depending on who uploaded the file.

According to another particular feature, the single account where the encrypted file is stored at the cloud storage provider is the account of the entity from which the file was last updated.

This feature enables to keep the economical advantages of the invention while providing equality of download access between different users.

On an applicative point of view, entities can be different users or different devices from a same user.

The present invention also relates to a method to manage the secure and economical sharing of at least one virtual folder, in which are stored encrypted files, using a server web application using a published API of a cloud storage provider, said folder being shared by a group of different entities, each entity having an identifier, said method comprising the steps of:
  generating a master key for each folder dedicated to the encryption of files to be shared with the group in said folder,
  accessing an encrypted file issued from encryption using said master key of a file originating from one of the entity in the group,
  determining, using an authorization control list (ACL), for each shared folder, identifiers of entities authorized to access files from said shared folder stored at the cloud storage provider, if the entity from which the file is originated is authorized to access the folder,
  sending the encrypted file to a single account in the cloud storage provider,
said method further comprising the steps of, on request from one entity of the group for a file in the folder:
  checking the authorization to access the folder of this requesting entity in the ACL,
  retrieving the shared encrypted file from the single account,
  forwarding it to the requesting entity.

This method implemented in a machine or a group of machines enables to produce a server of the invention and to propose a secure and economical sharing of files according to the invention. It has to be noted that the method includes preferably a step of encrypting the clear file, said method being fully implemented in a server.

According to a specific embodiment, the method further includes a step of generating an entity specific device key, a step of provisioning said entity with the specific key, and, said entity signing requests relative to the shared folder using said entity specific key, a step of verifying signature of requests originating from the entity.

According to an advantageous feature, the method further includes a step of adding a sharing user to share the shared folder in the authorization control list.

This feature enables to add a new user to the share while not having to modify the already encrypted files.

Advantageously, the method further includes a step of removing an existing user from the authorization list of a shared folder so that this user later does not have access to the files in the given shared folder.

Again the access control list feature enables to easily manage authorization to access file without having to delete the file from the storage folder in the service provider, or uploading a newly encrypted file to the storage provider. The encryption of the file does not change, even if the list of users having access to the file is modified Furthermore, the method advantageously further includes the step of copying all files contributed by the removed user to another user's account, and the step of cleaning up the files from the storage account of the user who was removed from share.

This feature enables any user that wants to be removed from a sharing list not to keep the shared files stored on his/her own account; thereby limiting the storage resources used on the user's account.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed.

Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1A:
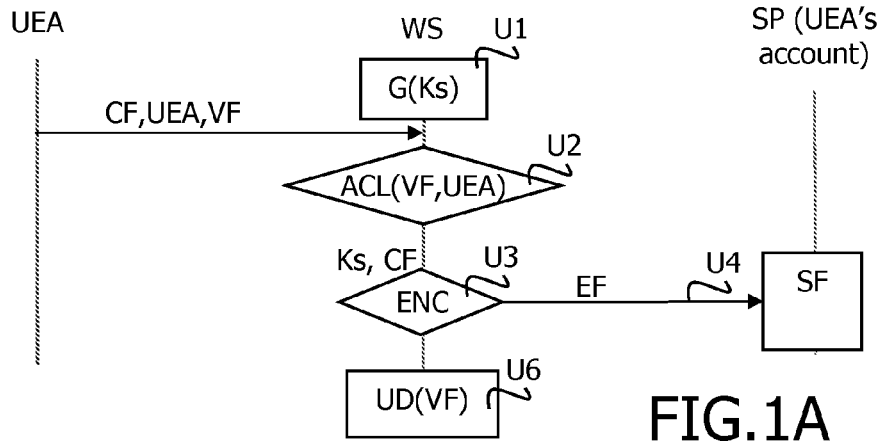
FIGS. 1A and 1B schematically shows a first embodiment of the invention.

The same elements have been designated with the same reference numerals in the different drawings. For clarity, only those elements and steps which are useful to the understanding of the present invention have been shown in the drawings and will be described.

FIG. 1A schematically shows the uploading of a file originating as a clear file CF from a first user equipment UEA using a web server WS of the invention in order to upload the file after encryption to a storage provider SP for storage of the cloud storage kind.

In a first step U1, the web server WS generates a master key Ks to be used for the encryption of files in a virtual folder VF. Such key can be generated in software, HSM (hardware security module), or in SE (secure element, such as smart card). The keys can be stored in software, HSM, or in SE.

In the presented embodiment, the virtual folder VF is associated with the account of the entity UEA. Then, in this embodiment, the entity UEA sends a request to store a clear file CF in the virtual folder VF at the storage provider SP. In a step U2, the web server WS then consults an authorization control list ACL(VF,UEA) listing, for each shared folder VF, identifiers of entities authorized to access files in said shared folder VF. If the entity UEA from which the file is originated is authorized to access the folder, in a step U3, the web server then uses the master key Ks to encrypt the clear file CF in an encrypted file EF. This encrypted file EF is then sent, in a step U4, to be stored in a storage folder SF on the UEA's account on service provider SP. The storage folder SF contains all files contributed by the given user to the virtual folder VF. Indeed virtual folders VF exist only in the server WS of the invention. Service provider SP has only storage folder SF associated to a user and where the encrypted file EF is stored as part of the content. At last, in a step U6, the virtual folder VF is updated to include the newly uploaded file CF.

Figure 1B:
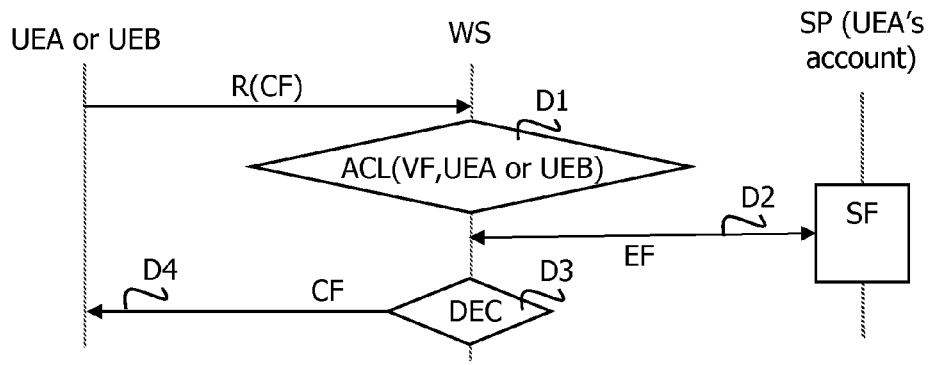

FIG. 1B shows schematically the downloading of a file from storage at the storage provider SP side on request R(CF) originating from another user equipment UEB. It is here noted that UEB could as well be the equipment UEA. First the server checks, in a step D1, here the authorization of the user equipment UEB. It has here to be noted that the invention requires a preliminary registration of any equipment UE intended to access to a given virtual shared folder VF. This registration is fully managed by the web server WS. When a user is added to an existing share folder, files already added to share do not have to be modified and user added can have an account on a different storage provider. The user is added to the ACL with the useful references relative to the shared folder and to the service provider.

If the user equipment UEB is authorized to access the shared folder VF, in a step D2, the web server retrieves the encrypted file EF from the storage provider SP. Then it decrypts the encrypted file in a step D3. At last, the clear file CF is sent to the user equipment UEB in a step D4.

With the invention, the file added to share folder is encrypted and uploaded to user's account on SP. Each user with authorization to access the shared folder can have an account at a different SP. When a file is added, all users in the shared folder group have immediate access to it. The added file resides in only one location, so no synchronization is needed. Since file resides in only one location, only one user's storage space is used on the SP. To download an encrypted file from the shared folder, file is decrypted in the web server and passed to the user.

Also when the removal of a user from a shared folder is required, the said user is simply removed from the ACL for the shared folder. Files already uploaded to this shared folder do not have to be changed. Files contributed by the removed user are advantageously copied to another user's account on the SP or the removed user's account on SP in cleaned up by deleting files. When the deletion of a shared folder is required, the corresponding ACL is removed so that no user has authorization to access to the shared files. Besides each user's account are cleaned up on their corresponding SP so files are deleted. When the system is able to deal with several service providers, the ACL has extra references to indicate which service provider is used.

Figure 2A:
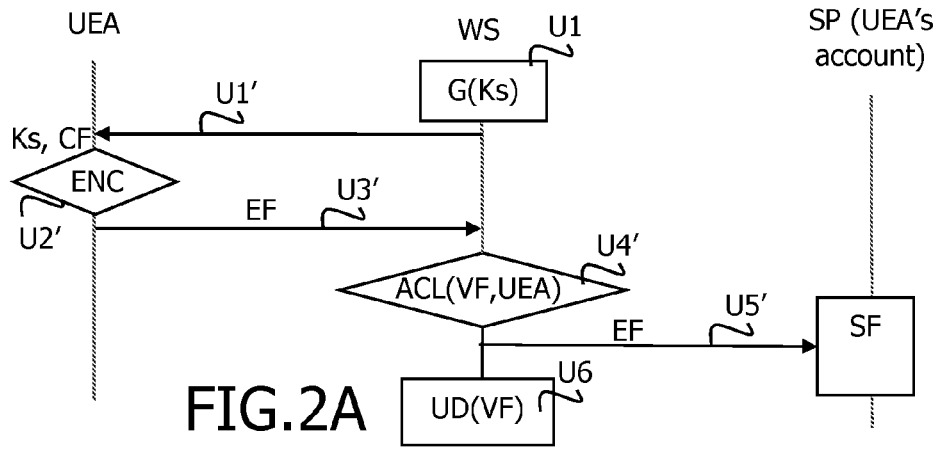
FIGS. 2A and 2B schematically shows a second embodiment of the invention.

On FIG. 2A is presented another embodiment of the invention where the master key Ks is generated in a step U1. Here the master key Ks is sent to the user equipment UEA in a step U1'. The encoding of a clear file CF is performed by the user equipment UEA in a step U2'. The encrypted file EF is then sent to the web server WS in a step U3'. The web server WS checks the access authorization of UEA in shared folder VF within the authorization control list ACL(VF, UEA) in step U4'. If UEA is authorized, the encrypted file EF is sent for storage to the storage provider SP in a step U5'. At last, the virtual folder VF is updated in a step U6 to include the newly uploaded file CF.

Figure 2B:
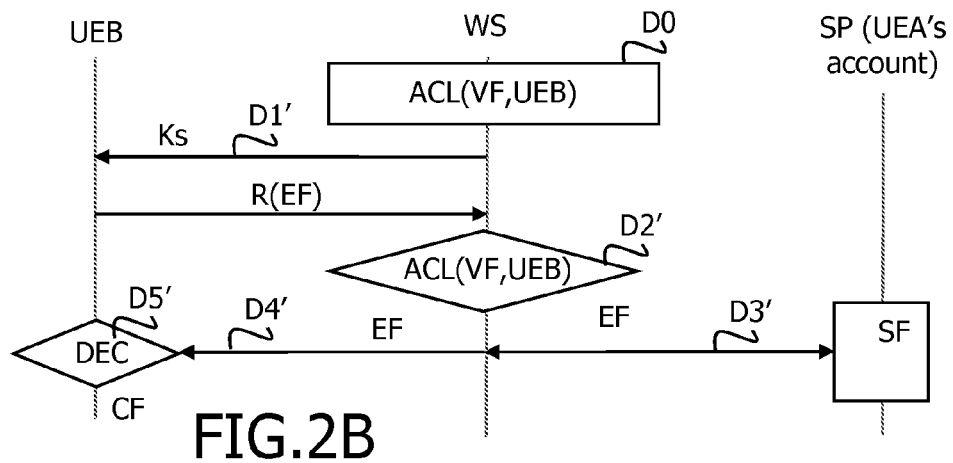

FIG. 2B shows the downloading of an encrypted file by another user equipment UEB. A preliminary step D0 consists here in referencing the authorization of the user equipment in the authorization control list ACL(VF,UEB). Then when UEB is authorized to access the virtual folder VF, the user equipment UEB is provisioned with the master key Ks in a step D1'.

Then under request R(EF) for the encrypted file EF from UEAB, the web server checks the authorization of the user equipment UEB in the authorization control list ACL (VF, UEB) in a step D2'. If the user equipment UEB is authorized to access the shared folder VF, the encrypted file EF is retrieved by the web server Ws from the storage folder SF in a step D3'. This encrypted file EF is then forwarded to the user equipment UEB in a step D4' before being decrypted using Ks in the user equipment UEB itself in a step U5'.

Embodiment described on FIGS. 2A and 2B are particularly adapted to the mobile devices. The encryption in the user equipment itself can indeed be strongly wished as it reduces the risk to have data malevolently spied.

Figure 3:
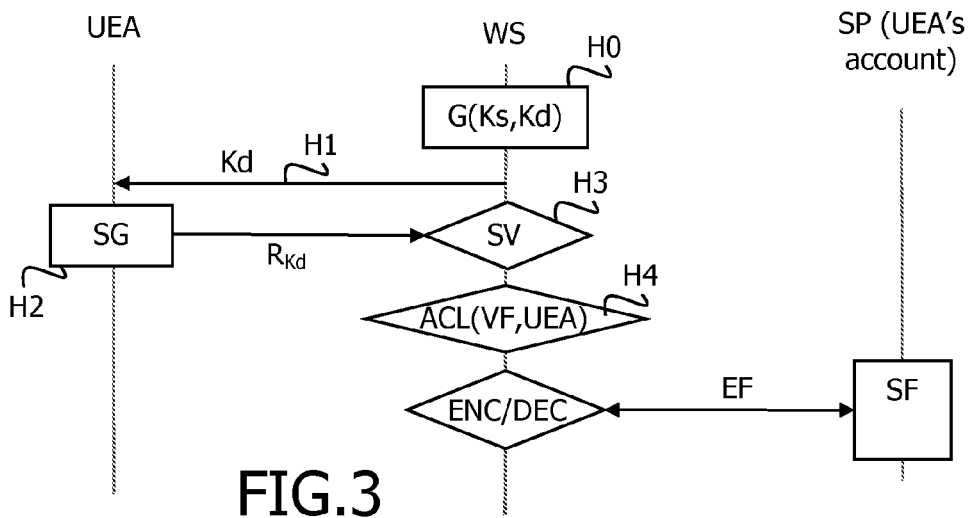
FIG. 3 schematically illustrates the case where the entity signs its request.

FIG. 3 shows a hybrid embodiment where at least two keys are generated in a step H0: a master key Ks and a device key Kd associated to the user equipment UEA for example. The device key Kd is sent to the user equipment UEA in a step H1.

In this embodiment, any upload/download request is signed in a step H2 by the user equipment using its device key Kd. Clear file transmission is not signed but done under SSL/TLS layer. The signed request $R_{Kd}$ is then sent to web server WS for verification of the signature in a step H3 and for processing of the request. Typically the authorization of the user equipment is then checked in a step H4. If UEA is authorized to access the shared folder VF, depending on the nature of the request $R_{Kd}$, encoding or decoding are performed in the web server and the encoding file EF is sent to or retrieved from the shared folder VF as disclosed in more details in FIGS. 1A and 1B.

It is noted here that it can be advantageous, in case the user equipment is a mobile device, to also send the share folder master key to the user equipment with the device specific key. In this case, the mobile device is able to encrypt/decrypt itself the file to be stored or to retrieve. It solves security issues specific to mobile devices in particular when file is uploaded from such a mobile device.

Figure 4A:
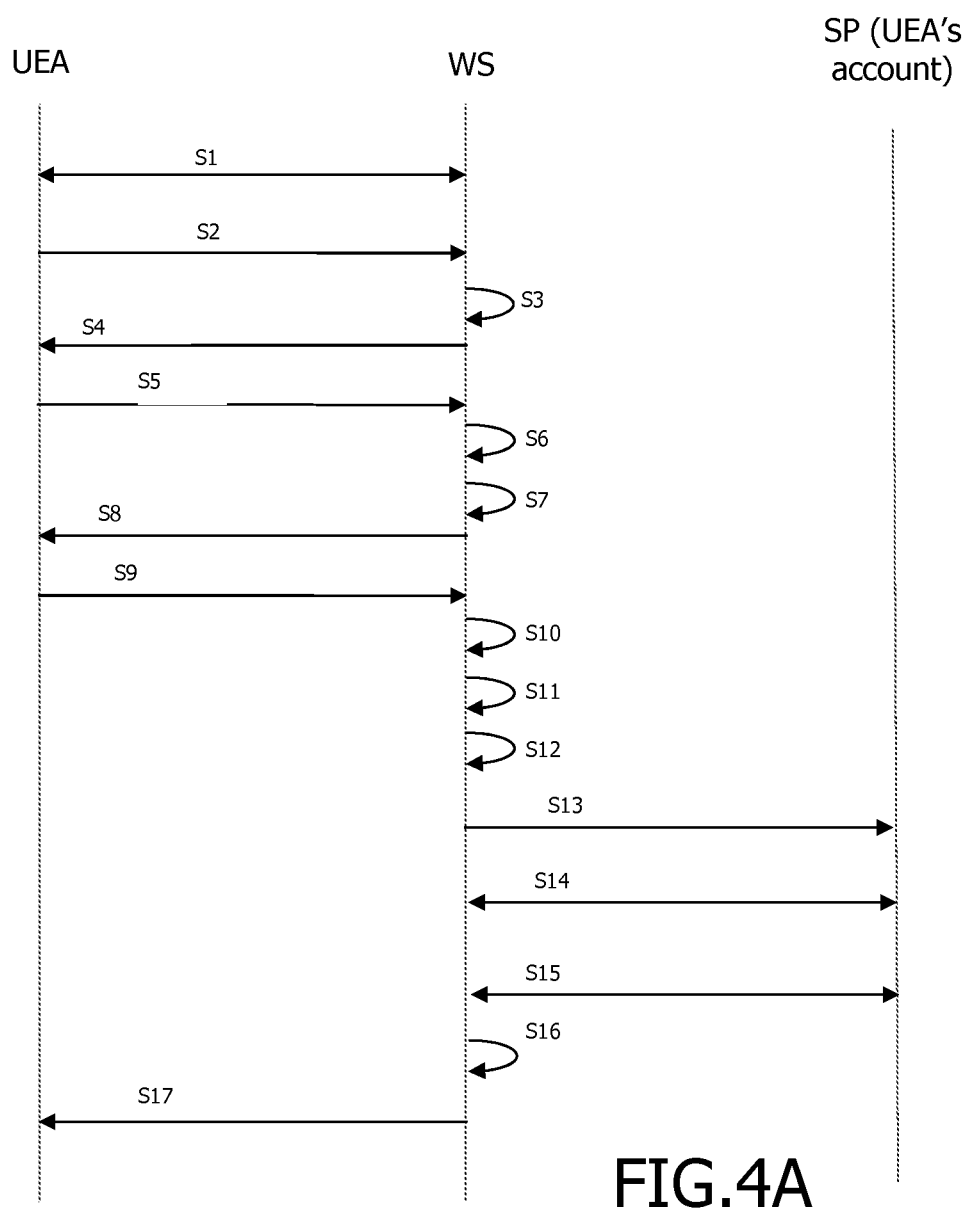
FIGS. 4A and 4B describes in detail respectively an uploading and a downloading of a file according to the invention.
Figure 4B:
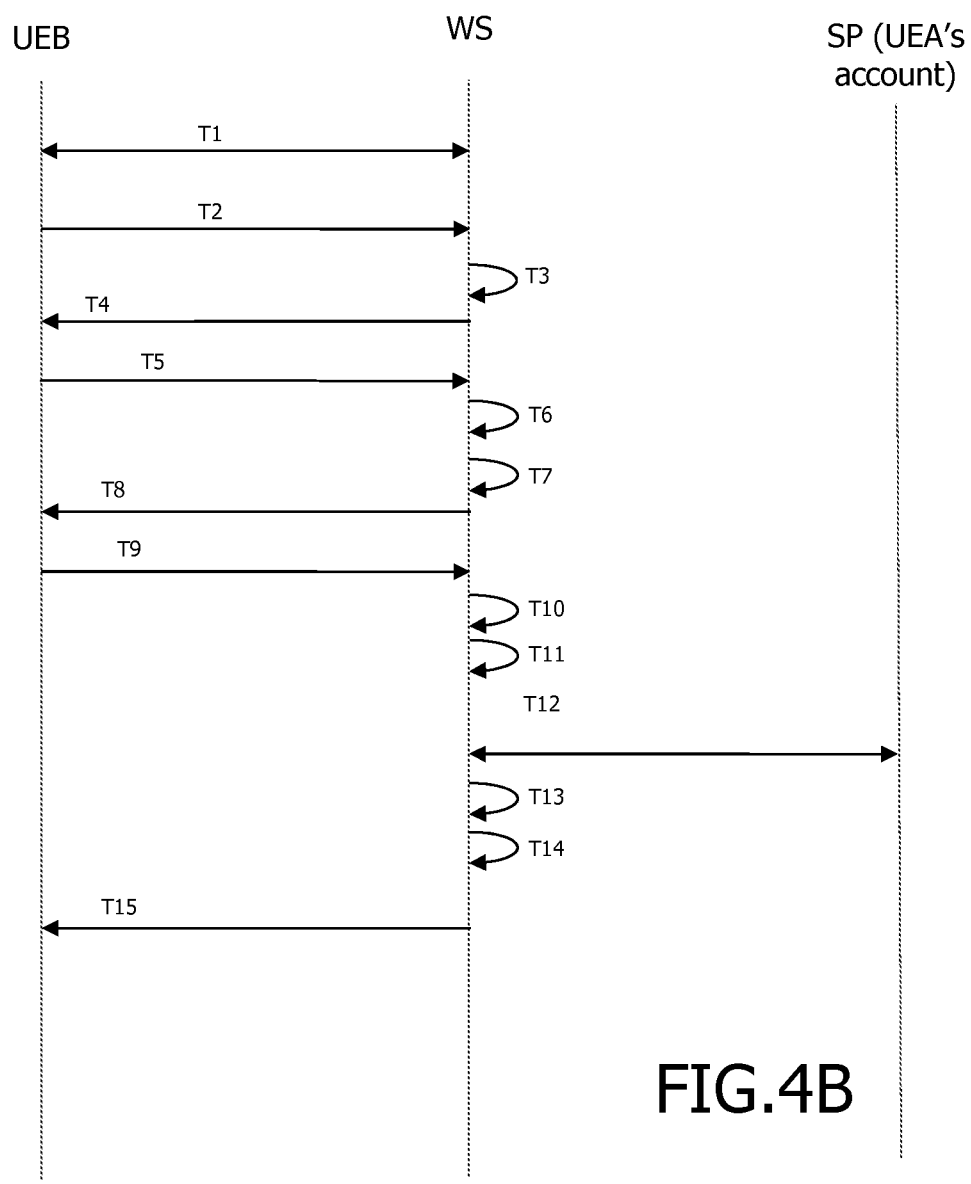

FIGS. 4A and 4B disclose a detailed sequence corresponding to the uploading and the downloading of file according to the first embodiment of the invention.

Typically the user equipment UEA is connected to the web server to a browser client. In a first step S1, the client logs in to the web server WS. Then the user requires access to storage space provided by the storage provider SP. This consists in a request to get a share folder list sent in a step S2. The web server then consults and builds a lookup table forming an authorization control list ACL in a step S3. A list of share folders for user UEA is then sent to user equipment UEA in a step S4.

The user chooses a share folder and asks for the access to this share folder in a step S5. The web server then checks the user permission to view in a step S6 and gets a list of files in this share folder in a step S7. The list of files in share folder is returned to UEA in a step S8. In a step S9, the user equipment uploads a file to the selected share folder. The web server WS checks the permission to add the file in a step S10. In a step 511, the web server WS gets a master key for the share folder. Typically the master key is retrieved from storage or generated using a key generator.

Then the web server WS encrypts the file using the master key in a step S12. The encrypted file is then uploaded to the storage provider SP in step S13. The web server WS thus gets public reference for uploaded file in step S14. It also gets copy reference for uploaded file in a step S15. Those meta data are stored by the web server about the new file in a step S16. The database thus includes at least a public reference and a copy reference for each file stored at the storage provider SP. Public reference is typically a URL that points to the file on storage provider SP. Anyone who has this URL can download the file. It can be used either directly through a browser, or through the API. CopyRef is a unique string (identifier) that can be used to copy a file from one user's account to another user's account on the same storage provider SP. This is done through API, and no download happens.

Advantageously a confirmation for the uploading of the file is at last sent to the user equipment UEA in a step S17.

On FIG. 4B, a downloading sequence is presented. A user equipment UEB logs in to the web server WS in a step T1. It asks for a share folder list in a step T2. In a step T3, the lookup table of the authorization control list is consulted. The list of share folders for this user is then sent to the user equipment UEB in a step T4. The user then selects a share folder in a step T5. The web server WS checks the permission to view for the user equipment UEB in a step T6 and gets a list of files in the selected share folder in a step T7. The list of files in share folder is returned to user equipment UEB in a step T8. A file is then selected for download in a step T9.

The web server WS then checks the permission to download the file in step T10. In a step T11, the web server WS then gets the public reference for the file from the database in web server WS. It uses this public reference to download the file from UEA's storage account in a step T12. Then the web server gets the master key for the concerned share folder in a step T13. In a step T14, the web server WS decrypts the encrypted file. At last the decrypted file in clear is forwarded to user equipment UEA in step T15.

Figure 5A:
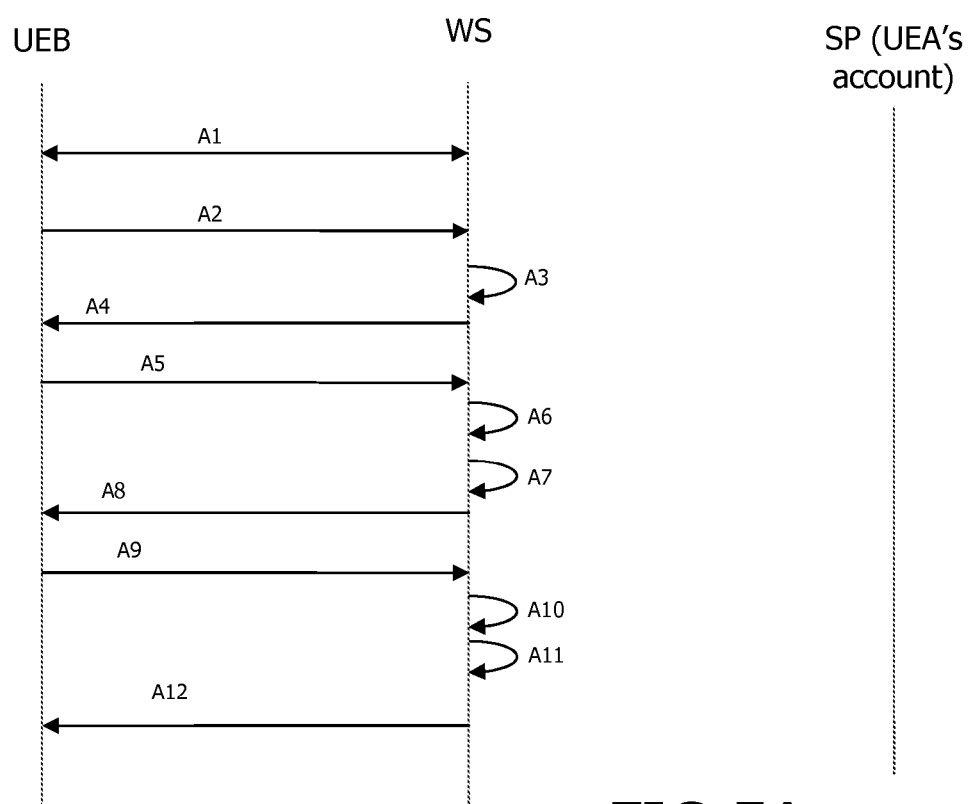
FIGS. 5A and 5B describes in details respectively the steps of adding a user to an existing share folder and the similar steps when a user is removed from a shared folder.

FIG. 5A describes the steps for adding a new user UEA2 to an existing shared folder. A user equipment UEB logs in to the web server WS in a step A1. It asks for a share folder list in a step A2. In a step A3, the lookup table of the authorization control list is consulted. The list of share folders for this user is then sent to the user equipment UEB in a step A4. This list has information about what shared folders are created by this user, and what shared folders this user has been invited to. The user then selects a share folder that he has created in a step A5. He is the owner of this shared folder. The web server WS checks the permission to view for the user equipment UEB in a step A6, and gets a list of files in the selected share folder in a step A7. Also returned in step A7 is the list of other users authorized to access this shared folder. The list of files in share folder, and users who have access to this shared folder is returned to user equipment UEB in a step A8. The user UEB clicks the edit user list link for this shared folder, and asks that a new user UEA2 be added to the shared folder. This request is sent to WS in step A9. In step A10, the WS consults the ACL to ensure that the user, UEB, is authorized to change the shared folder meta data. In step A11, the new user UEA2 is added to the ACL list for the shared folder. The confirmation of this addition, along with the updated user list is sent back to the user in step A12. Notice that in doing so, no file needs to be decrypted and then re-encrypted. Also, there is no communication needed with the SP.

Figure 5B:
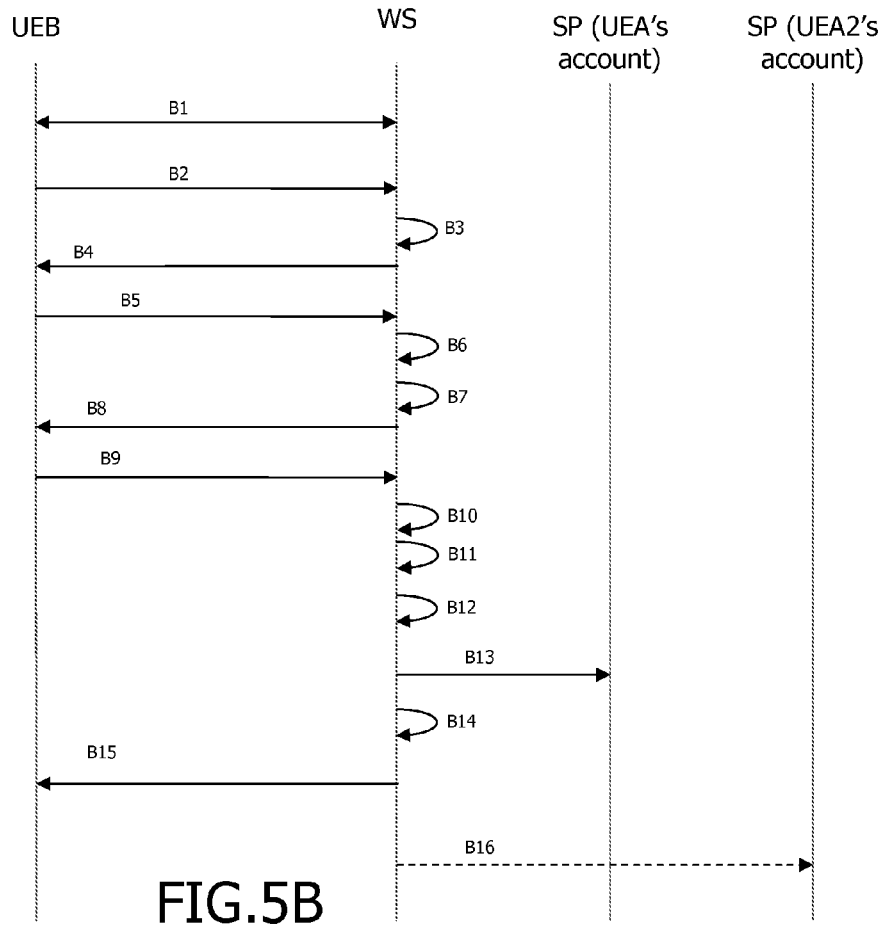

FIG. 5B describes the steps for removing an existing user from an existing shared folder. A user equipment UEB logs in to the web server WS in a step B1. It asks for a share folder list in a step B2. In a step B3, the lookup table of the authorization control list is consulted. The list of share folders for this user is then sent to the user equipment UEB in a step B4. This list has information about what shared folders are created by this user, and what shared folders this user has been invited to. The user then selects a share folder that he has created in a step B5. He is the owner of this shared folder. The web server WS checks that the user has permission to view the folder contents in step B6. It also and gets a list of files in the selected share folder in a step B7. Also returned in step B7 is the list of other users authorized to access this shared folder. This list of files in share folder, and users who have access to this shared folder is returned to user equipment UEB in a step B8. The user clicks the edit user list link for this shared folder, and asks that an existing user, UEA2 be removed from the shared folder. This request is sent to WS in step B9. In step B10 the WS consults the ACL to ensure that the user, UEB, is authorized to change the shared folder meta data. In step B11, the existing user UEA2 is removed from the ACL list for the shared folder. The WS now checks for all files in this shared folder that have been contributed by this existing user UEA2, in step B12. In step B13 the WS transfers all these files from UEA2's account on SP to UEA's account, typically by copy and subsequent deletion. This ensures that the files will still be available to other users of the shared folder, even if the user UEA2 who contributed the files is no longer part of the share. The confirmation of this user removal, along with the updated user list is sent back to the user UEB in step B15. At a later time, when user UEA2 connects to the WS, the files from his account, that were copied to UEA's account in step B13, are now removed from UEA2's account on the SP. This is shown in step B16.

Figure 6:
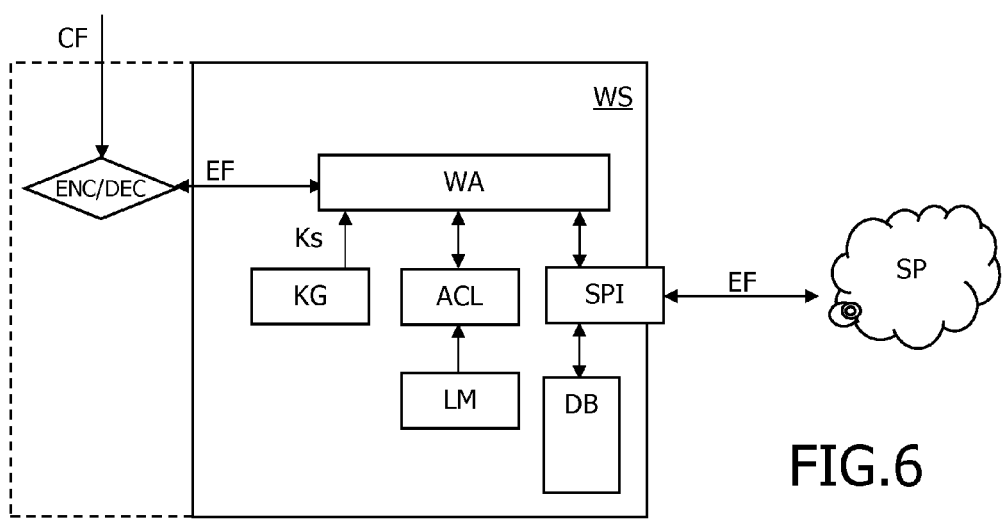
FIG. 6 represents schematically a server of the invention.

FIG. 6 describes schematically a web server WS of the invention. It is here noted that this server can in practice be implemented in a single machine or in several physical machines. This server WS comprises a web application WA dedicated to sharing of encrypted files EF residing at cloud storage providers SP. This web application WA is in relation with at least a key generator KG able to generate keys. In particular the master key used to encrypt/decrypt data in an encoder/decoder ENC/DEC. It is here noted that the dashed line enables to distinguish first and second embodiments. In the second embodiment, this encoder/decoder is implemented in the user equipment while it is included in the web server WS in the preferred first embodiment. The web application is also linked with an authorization control list ACL managed by a list manager LM. At last the web application WA is also related to an interface SPI dedicated to be used for communication with the storage provider SP. This interface uses a database DB storing public references for files transferred by the web application WA towards the storage provider SP. The database DB also includes copy references.

The invention provides a complete user/client/owner control over encryption of data before sending to cloud storage provider. With the invention, the same user can access his data securely from multiple devices; office PC, home PC, mobile phone. Also the data can be securely shared among multiple users, both internal to an enterprise, and external partners. At last less storage quota is required to participate in file sharing than the sharing features offered directly by the storage providers.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled.

The invention claimed is:

1. A server having a web application using a published Application Programming Interface (API) of one or more cloud storage providers, said web application being dedicated to secure and economical sharing of encrypted files residing at the cloud storage providers, said files being managed under a virtual folder which is shared by a group of different entities, each entity having an identifier, said server having an interface with the entities to receive and send files from and to the entities and having an interface with the cloud storage providers to receive and send files from and to a corresponding storage folder stored at the cloud storage provider, said server further comprising, for the implementation of the web application:
   a hardware processor configured to implement the following:
      a key generator to generate at least a master key for each virtual folder dedicated to the encryption of files to be shared with the group in said virtual folder,
      access to an encrypted file issued from encryption using said master key of a file originating from one of the entities in the group,
      an authorization control list (ACL) for each shared virtual folder, said ACL listing identifiers of entities authorized to decrypt the encrypted files that are part of the shared virtual folder, and are stored at the cloud storage provider,
      an ACL manager to manage the content of the ACL,
   wherein said API with the cloud storage provider is such that:
      it sends the encrypted file on a single account in the cloud storage provider, thus providing economical sharing of files among several entities by usage of the storage quota of a single account per file shared,
      on request from one entity of the group for a file in the virtual folder, after a check of the authorization of said one entity in the ACL, it retrieves the shared encrypted file from the single account at the storage provider, decrypts the file to get clear-text file, and forwards the clear-text file to the requesting entity, and under request for removal of an existing user to access the shared virtual folder, it checks for all files in this shared folder that have been contributed by this existing user, removes the existing user from the authorization control list ACL of a shared virtual folder so that this user later does not have access to the flies in the given shared virtual folder, copies all files contributed by the removed user to another user's account, and deletes the files from the storage account of the user who was removed from sharing.

2. The server according to claim 1, further including an encryption/decryption module to encrypt the file to be shared inside the server, the access to the encrypted file being provided by this encryption/decryption module, said encryption/decryption module also decrypting the retrieved shared encrypted file before forwarding it to requesting entity.

3. The server according to claim 1, wherein said key generator also generates an entity specific key and has a secure provisioning module to provision said entity with the specific key, wherein requests from this entity are signed using the entity specific key before being sent to the server, said server further including a cryptography module to verify such signatures.

4. The server according to claim 1, wherein entities are chosen among the group formed by web browser clients, PC client applications, and mobile devices.

5. The server according to claim 1, wherein said server provisions entities of the group with the generated master key to enable them to encrypt a file to be shared and to send the encrypted file to said server, wherein the access of the web server to the encrypted file is thus provided by such an entity.

6. The server according to claim 1, wherein the single account where the encrypted file is stored at the cloud storage provider is the account of the entity from which the file originates.

7. The server according to claim 1, wherein the single account where the encrypted file is stored at the cloud storage provider is the account of the entity from which the file was last updated.

8. The server according to claim 1, wherein entities are different users.

9. The server according to claim 1, wherein entities are different devices from a same user.

10. A method to manage the secure and economical sharing of at least one virtual folder, in which are stored encrypted files, using a server web application using a published Application Programming Interface (API) of a cloud storage provider, said virtual folder being shared by a group of different entities, each entity having an identifier, said method comprising the steps of:

generating a master key for each virtual folder dedicated to the encryption of files to be shared with the group in said virtual folder, accessing an encrypted file issued from encryption using said master key of a file originating from one of the entities in the group, determining, using an authorization control list (ACL) listing, for each shared virtual folder, identifiers of entities authorized to access files from said shared virtual folder stored at the cloud storage provider, if the entity from which the file is originated is authorized to access the virtual folder, sending the encrypted file on a single account in the cloud storage provider, on request from one entity of the group for a file in the virtual folder:

checking the authorization to access the virtual folder of this requesting entity in the ACL, retrieving the shared encrypted file from the single account, and forwarding the shared encrypted filed to the requesting entity said method further including, under request for removal of an existing user to access the shared virtual folder, a step of checking for all files in this shared folder that have been contributed by this existing user, a step of removing the existing user from the authorization control list ACL of a shared virtual folder so that this user later does not have access to the files in the given shared virtual folder, a step of copying all files contributed by the removed user to another user's account, and a step of deleting the files from the storage account of the user who was removed from sharing.

11. The method according to claim 10, further including a step of generating an entity specific key, a step of provisioning said entity with the specific key and with the master key for the shared virtual folder, and, said entity signing requests relative to the shared virtual folder using said entity specific key, a step of verifying signature of requests originating from the entity.

12. The method according to claim 10, further including a step of adding a sharing user to share the shared virtual folder in the authorization control list ACL.

13. The method according to claim 12, whereby adding a user from the authorized list ACL of a shared virtual folder can be done without re-encrypting the already encrypted files in said shared folder.

14. The method according to claim 12, whereby removing a user from the authorized list ACL of a shared virtual folder can be done without re-encrypting the already encrypted files in said shared folder.

* * * * *